United States Patent
Norek

(10) Patent No.: US 6,283,668 B1
(45) Date of Patent: Sep. 4, 2001

(54) NO-SLIP CORNER JOINT

(75) Inventor: Richard S. Norek, Eliot, ME (US)

(73) Assignee: Norek Technical Resources, Inc., Eliot, MN (US)

( * ) Notice: Subject to any disclaimer, the term of this patent is extended or adjusted under 35 U.S.C. 154(b) by 0 days.

(21) Appl. No.: 09/563,738

(22) Filed: May 3, 2000

(51) Int. Cl.$^7$ .................................................. B25G 3/00
(52) U.S. Cl. ......................... 403/231; 403/382; 403/402
(58) Field of Search .................................. 403/403, 282, 403/346, 401, 402, 231, 263; 54/589.1, 590.1, 590.2, 590.3, 591.1, 591.4, 233

(56) References Cited

U.S. PATENT DOCUMENTS

| | | |
|---|---|---|
| 589,836 | 9/1897 | Koll . |
| 1,924,240 | 8/1933 | Harwell . |
| 2,263,198 | 11/1941 | Valiton . |
| 2,607,311 | 8/1952 | Doan . |
| 4,008,553 | 2/1977 | Oliver . |
| 4,261,148 * | 4/1981 | Scott .................................. 52/285 |
| 4,287,694 | 9/1981 | Cornell . |
| 4,324,445 | 4/1982 | Schaefer . |
| 4,383,780 * | 5/1983 | Davison .............................. 403/382 |
| 4,624,295 | 11/1986 | Howland . |
| 4,684,282 | 8/1987 | Lever . |
| 5,103,610 * | 4/1992 | Walters ................................ 52/233 |
| 5,553,967 | 9/1996 | Uozumi . |
| 5,560,409 | 10/1996 | Knorr . |
| 5,733,024 | 3/1998 | Slocum et al. . |
| 5,848,852 | 12/1998 | Shpigel . |
| 5,899,251 | 5/1999 | Turner . |
| 5,983,583 * | 11/1999 | Mattix ............................... 52/282.5 |
| 6,033,326 * | 3/2000 | Lee ...................................... 473/560 |
| 6,045,290 * | 4/2000 | Noclevski ............................ 403/231 |
| 6,098,365 * | 8/2000 | Martin ............................... 52/592.1 |
| 6,132,129 * | 10/2000 | Frazler ................................ 403/382 |

FOREIGN PATENT DOCUMENTS

| 3333-623 | 4/1985 | (DE) . |
|---|---|---|

* cited by examiner

*Primary Examiner*—Beth A. Stephan
(74) *Attorney, Agent, or Firm*—Phillip E. Decker

(57) ABSTRACT

A no-slip corner joint having a mortise and at least one tenon, wherein the mortise in a first structural member is defined by at least one V-shaped groove portion of a given width terminating in two opposing face portions that are perpendicular to the mating surfaces of the first structural member, and the tenons in other structural members are defined by V-shaped projection portions of a given width terminating in two opposing face portions parallel to a mating edge of the other structural members.

21 Claims, 7 Drawing Sheets

NO-SLIP CORNER JOINT

BACKGROUND

1. Field of the Invention

The invention relates to joints for joining structural members, primarily those structural members made of wood.

2. Description of the Related Art

Wood is widely known to be an excellent building material. Compared to other building materials like steel and concrete, wood is is strong but light; machinable and durable; inexpensive and can be used for building by anyone who has access to the simplest of tools. It is therefore widely used to construct our houses and furniture.

Because wood is so widely used, the joints used in connecting structural members together are very important. Some of the most common joints are made by simply abutting the end of one structural member to the other. This type of joint requires other hardware—like nails, dowels or brackets—to hold them together. This is perhaps the most common type of joint used in home building and furniture making.

Another type of joint is formed by chamfering the ends of structural member, and securing them together somehow. Typically, the ends have to be glued or nailed together, or both. This is a common type of joint used in picture frames. The problem with this type of joint is that it does not withstand shear forces very well, and any force on the structure will impart shear forces on the joint. Glued joints of this type are weak, since glue does not withstand shear forces well. Nailed joints would tend to separate.

One solution that has been tried in the past is disclosed in U.S. Pat. No. 4,684,282, by Lever, that is not admitted to be prior art by its inclusion in this Background section. Lever discloses an interlocking joint with a mortise and tenon. However, the members are chamfered, and therefore result in shear stresses on the joint whenever force is put on the structure. This would tend to separate the members, and forms a relatively weak joint.

Another solution is disclosed in U.S. Pat. No. 5,848,852, by Shpigel, that is also not admitted to be prior art by its inclusion in this Background section. Shpigel discloses a strong joint, but one that is very complex to manufacture. He also requires addition hardware, like screws, in order to assemble the joint.

What is needed, therefore, and has not been found in the prior art is a joint in which shear force is not carried by glue; does not require extra hardware like inserts, dowels, screws, or brackets; is easy to produce with ordinary tools; and will accommodate either two or three structural members.

SUMMARY

The present invention is directed to a joint that satisfies these needs. A joint having the features of the present invention comprises a mortise and at least one tenon, wherein the mortise in a first structural member is defined by at least one V-shaped groove portion of a given width terminating in two opposing face portions that are perpendicular to the mating surfaces of the first structural member, and the tenons in other structural members are defined by V-shaped projection portions of a given width terminating in two opposing face portions parallel to a mating edge of the other structural members. These and other features, aspects, and advantages of the present invention will become better understood with regard to the following description and accompanying drawings.

DRAWINGS

DESCRIPTION

Figure 1:
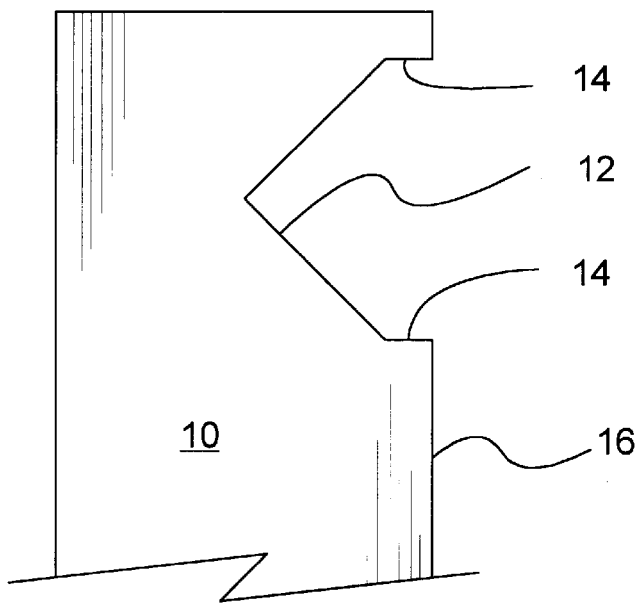
FIG. 1 is a side view of a structural member having a mortise.

Turning to the drawings, FIG. 1 shows a side view of a first structural member 10 having a mortise for a two member joint. It should be noted at the start that the structural members described in this specification can be made of wood, or any other building material. Also, the structural members can be beams, columns, slabs, floors, or any other type of structure. Although most of the figures show the structural members joined at right angles, it is understood that the invention can be modified such that members can be joined at non-right angles as well.

The mortise is defined by a V-shaped groove portion 12 of a given width, terminating in two opposing face portions 14. The opposing face portions 14 are perpendicular to the mating surface 16. That is to say, the tenon is mated to the mortise on the mating surface 16 side of the structural member 10.

Figure 2:
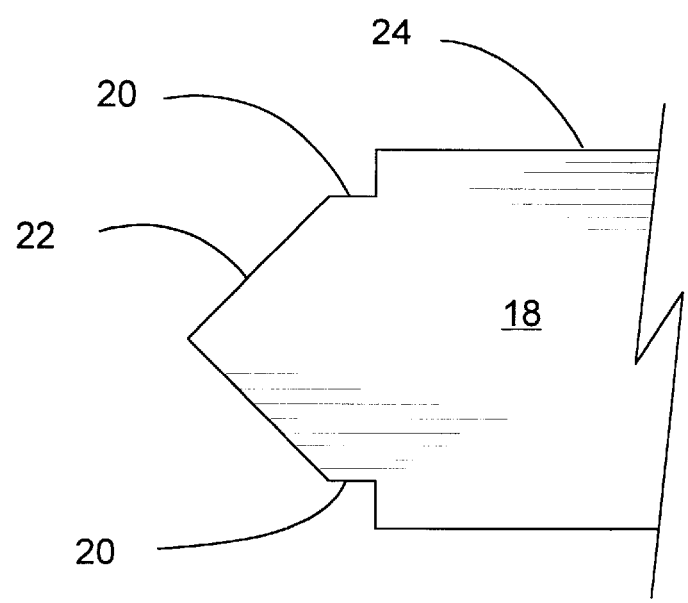
FIG. 2 is a side view of a structural member having a tenon.

FIG. 2 shows the corresponding second structural member 18 having a tenon for a two member joint. The tenon is defined by a V-shaped projection portion 22 of a given width, terminating in two opposing face portions 20 that are parallel to a mating edge 24 of the structural member 18. Although the second structural member is shown as having a thickness that is greater than the given width of the V-shaped projection portion 22, it is not necessary that it is greater. The thickness could otherwise be the same or less than that of the given width.

The included angles formed by the V-shaped groove portion 12 and and V-shaped projection portion 22 are preferably 90 degrees. However, all that is required is that the included angles of those portions are substantially the same so that they interlock when assembled. The angles can be of almost any size.

Figure 3:
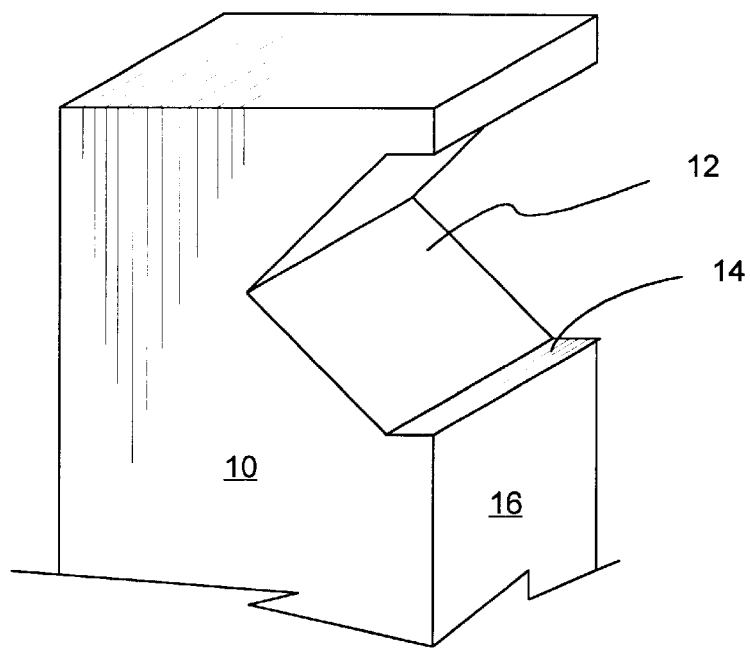
FIG. 3 is a perspective view of a structural member having a mortise.

FIG. 3 shows the first structural member 10 in a perspective view. The first structural member 10 is shown as a column, but could just as easily be a wall of, for example, a piece of furniture or cabinet.

Figure 4:
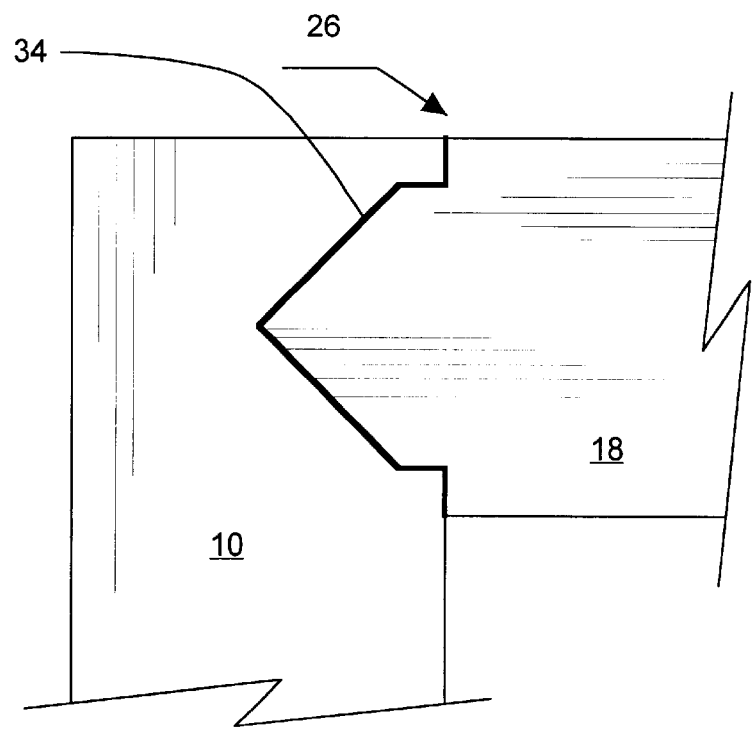
FIG. 4 is a side view of the joint according to the present invention as assembled.

FIG. 4 is a side view of an assembled two member joint 26. The V-shaped projection portion 22 of the second structural member 18 interlocks with the V-shaped groove portion 12 of the first structural member 10. Preferably an adhesive 34 is disposed between the two structural members before assembling them to provide a strong no-slip corner joint. The adhesive can be glue, caulk, epoxy, or any other type of adhesive that is well known in the art.

Significantly, the opposing face portions 14 of the first structural member 10 support the opposing face portions 20 of the second structural member 18 when the joint 26 is assembled in the horizontal position. There is no tendency for the members to separate when a load is placed on the assembled structure as there is with joints in the prior art. The V-shaped portions serve to precisely interlock the members, and the opposing faces provide support. Also, no other hardware is required to secure the joint 26. There is no need for brackets, dowels, screws, or nails.

Figure 5:
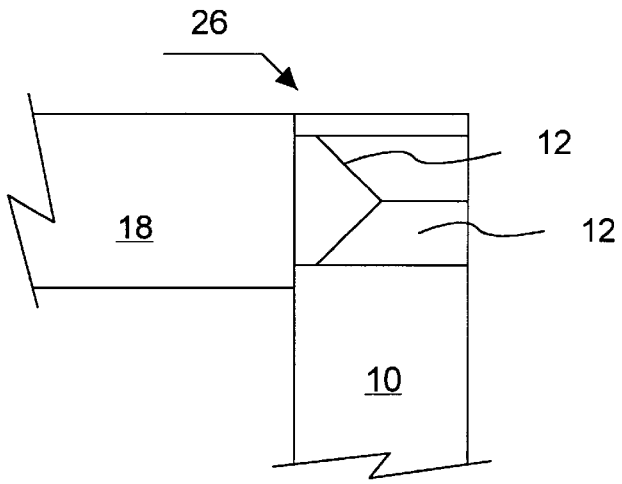
FIG. 5 is a side view a three member joint without the third member.

FIG. 5 is a side view of a three member joint 26, with one of the members removed to expose the mortise and tenon. A first structural member 10 has a mortise suitably adapted for receiving two tenons substantially 90 degrees apart from each other. The mortise comprises two V-shaped groove sections 12 of a given width terminating in two opposing face portions 14 perpendicular to two mating surface of the first structural member 10.

The tenons in the second and third structural members 18 comprise two V-shaped projection portions 22 of a given width terminating in two opposing face portions 20 that are parallel to the mating edges of the second and third structural members. The mating edge is defined as the line formed by the end of the V-shaped projection portions 22.

Figure 6:
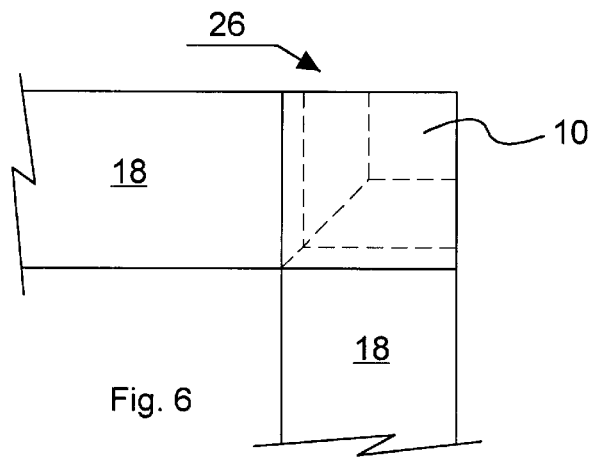
FIG. 6 is a top view of a right angle three member joint.

FIG. 6 is a top view of a three member joint 26. The dashed lines show the interlocking of the tenons and mortise of the second and third structural members 18 joined to the first structural member 10.

Figure 7:
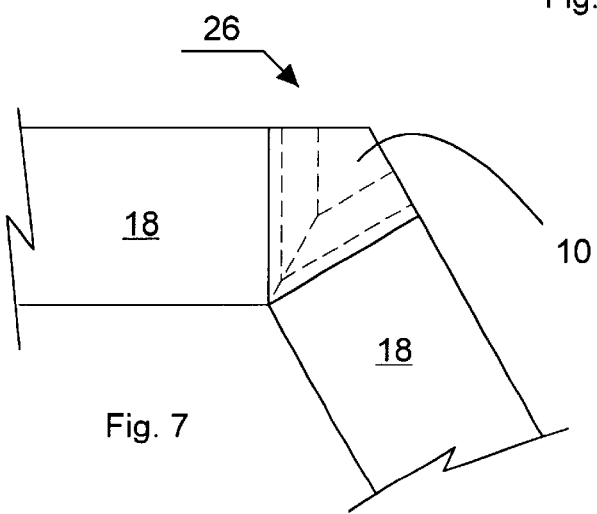
FIG. 7 is top view of a non-right angle three member joint.

FIG. 7 is a top view of a three-member joint that is not joined at right angles. The figure shows the two tenons joined at a 120 degree included angle, and a mortise adapted so that they interlock. Although a 120 degree angle is shown, it is to be understood that the invention can be adapted to form any angle required for structural members.

Figure 8:
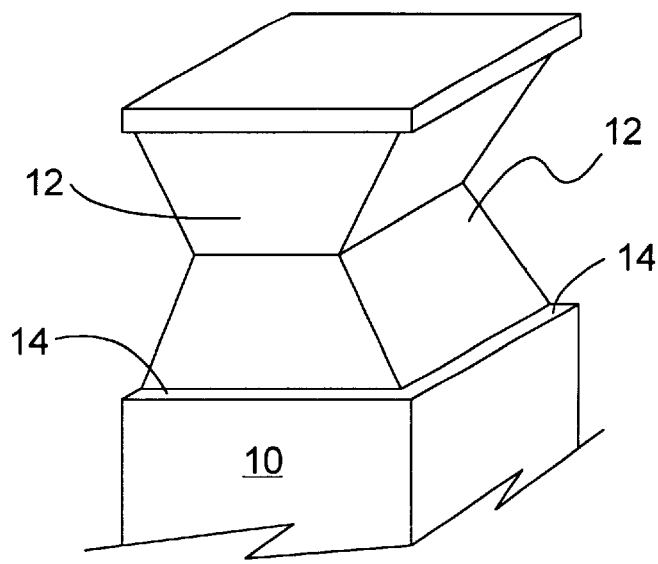
FIG. 8 is a perspective view of a structural member having mortises for two other members.

FIG. 8 is a perspective view of the a first structural member 10 having a mortise suitably adapted to receive two tenons from the second and third structural members.

Figure 9:
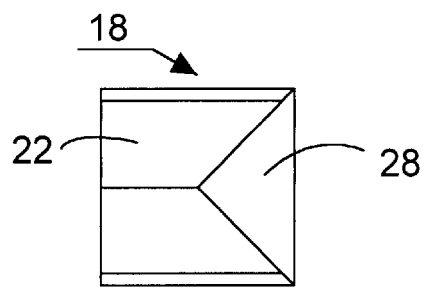
FIG. 9 is an end view of a structural member having a tenon suitable for a three member joint.
Figure 10:
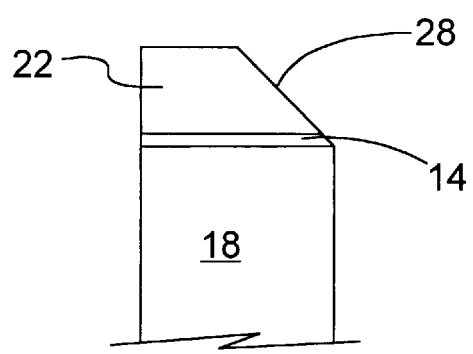
FIG. 10 is a side view of the member shown in FIG. 8.

FIGS. 9 and 10 are an end view and side view of either the second or third structural members 18 of a three member joint. The V-shaped projection portion 22, similar to the two member joint, is clearly shown. However, it is necessary in the three member joint to have a 45 degree face 28 on one side if one is making a right angle joint. This will allow them to be assembled and interlocked together as shown in FIG. 6. The 45 degree face 28 starts at substantially the center of the V-shaped projection portion 22, and goes to the edge of the tenon. An angle different than 45 degrees would be used for making a non-right angle.

Figure 11:
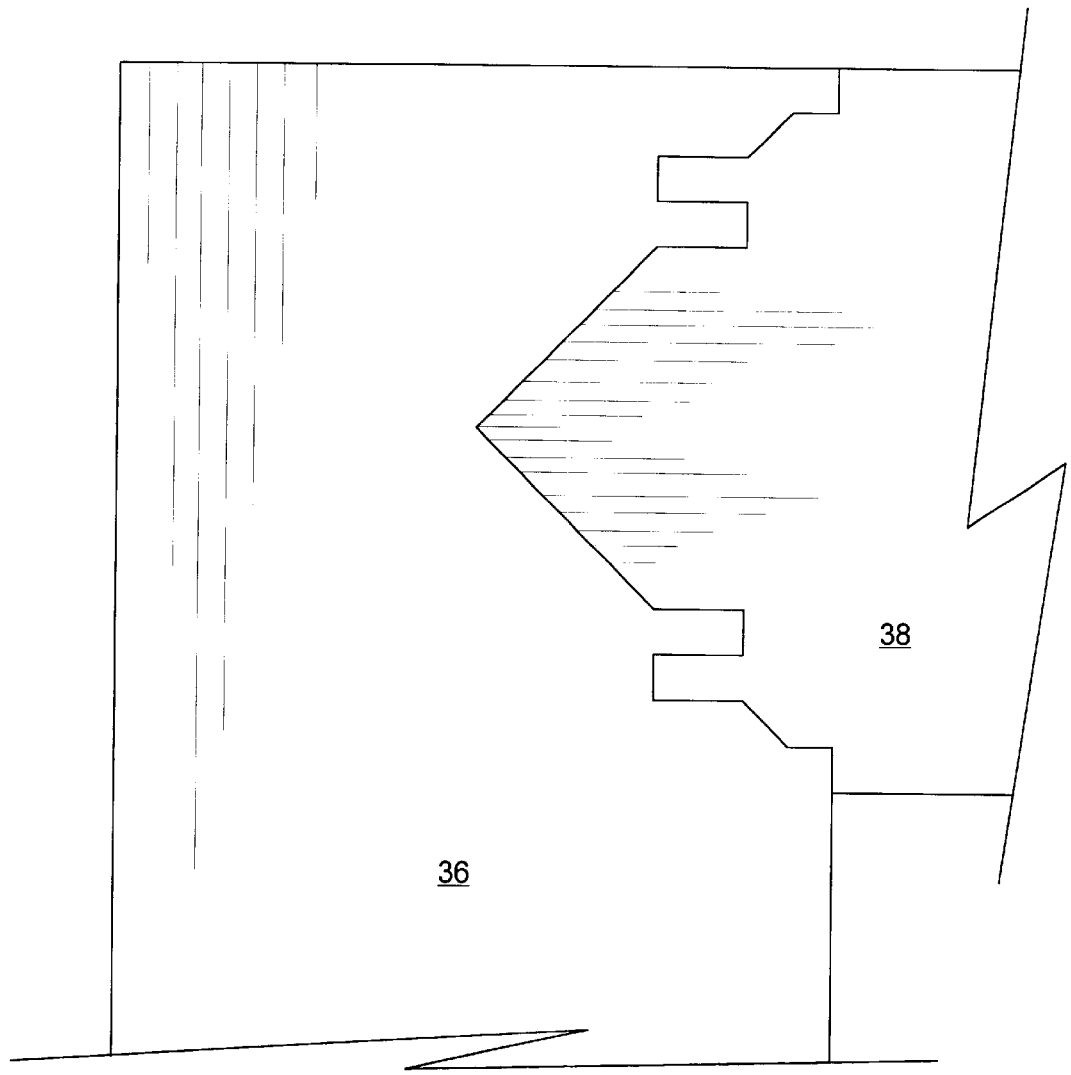
FIG. 11 is a side view of a joint having an alternative embodiment of the mortise and tenon of the present invention.

FIG. 11 is another embodiment of the present invention. The figure shows a side view of a two member double tongue and groove joint. Instead of having only a tenon comprising a V-shaped projection portion terminating in a pair of opposing faces on the second structural member 38, this joint also has two additional tongues for added strength. The mortise in the first structural member 36 is formed to interlock with the tenon of the second structural member 38.

Figure 12:
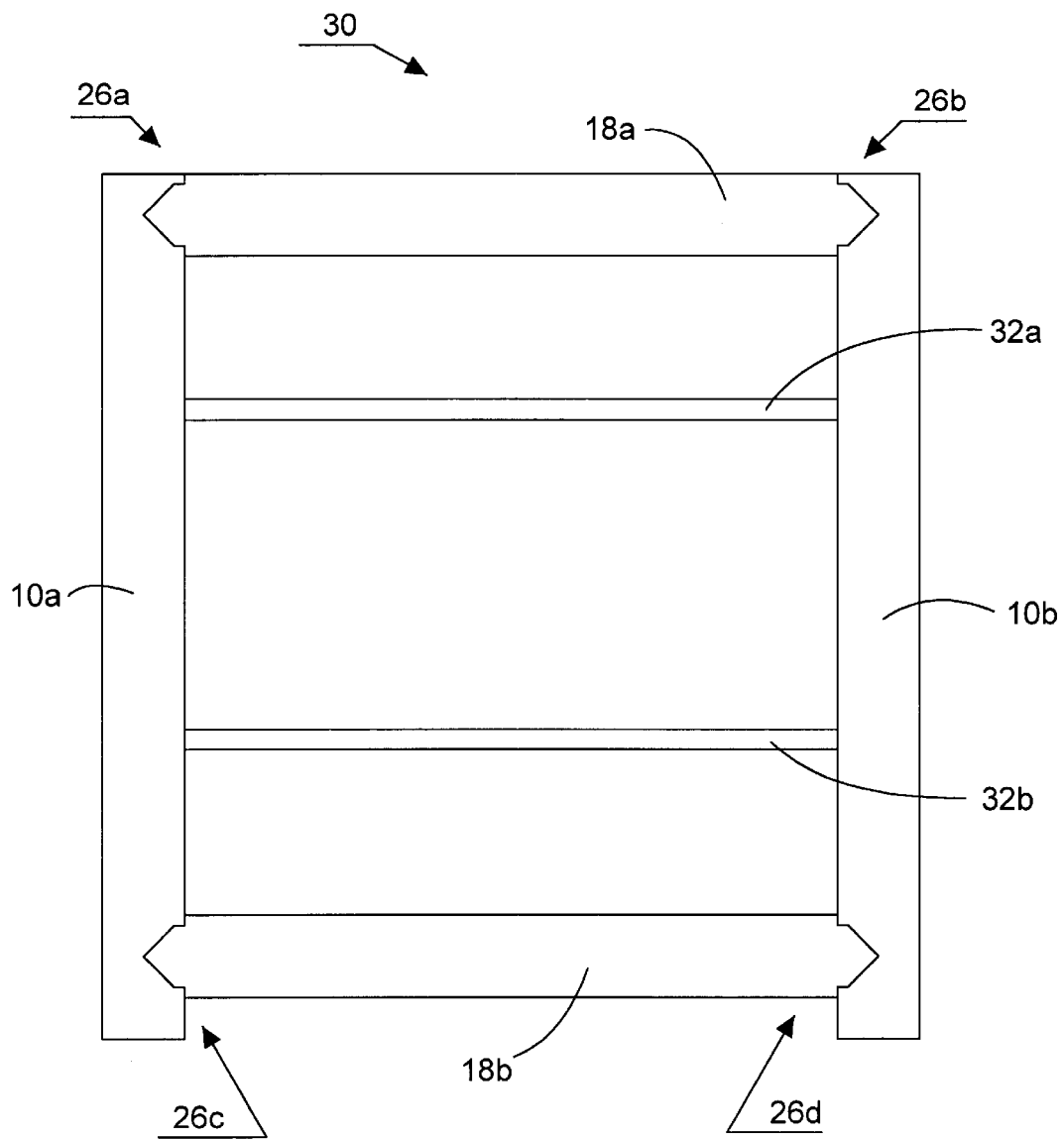
FIG. 12 is a front view of a book case made using the joint of the present invention.

FIG. 12 is a front view of a book case 30 made with the joints 26 of the present invention. The joint 26 lends itself to making almost any type of furniture. Two of the first structural members 10a and 10b have mortises that accept the tenons of the two second structural members 18a and 18b to form four joints 26a, 26b, 26c, and 26d. The first structural members 10a and 10b can be solid walls, and a two member joint can be used. However, panels (not shown) can be attached to the edges of beam and column type structural members, which would require that the joints be of the three member kind. The panels could be assembled by inserting them into grooves formed into the structural members. Such grooves are shown in U.S. Pat. No. 4,684,282 as item 6 in the figures. Additional shelves 32a and 32b are shown not having the joint of the present invention, but they could employ the joint to give the book case 30 the maximum strength.

Figure 13:
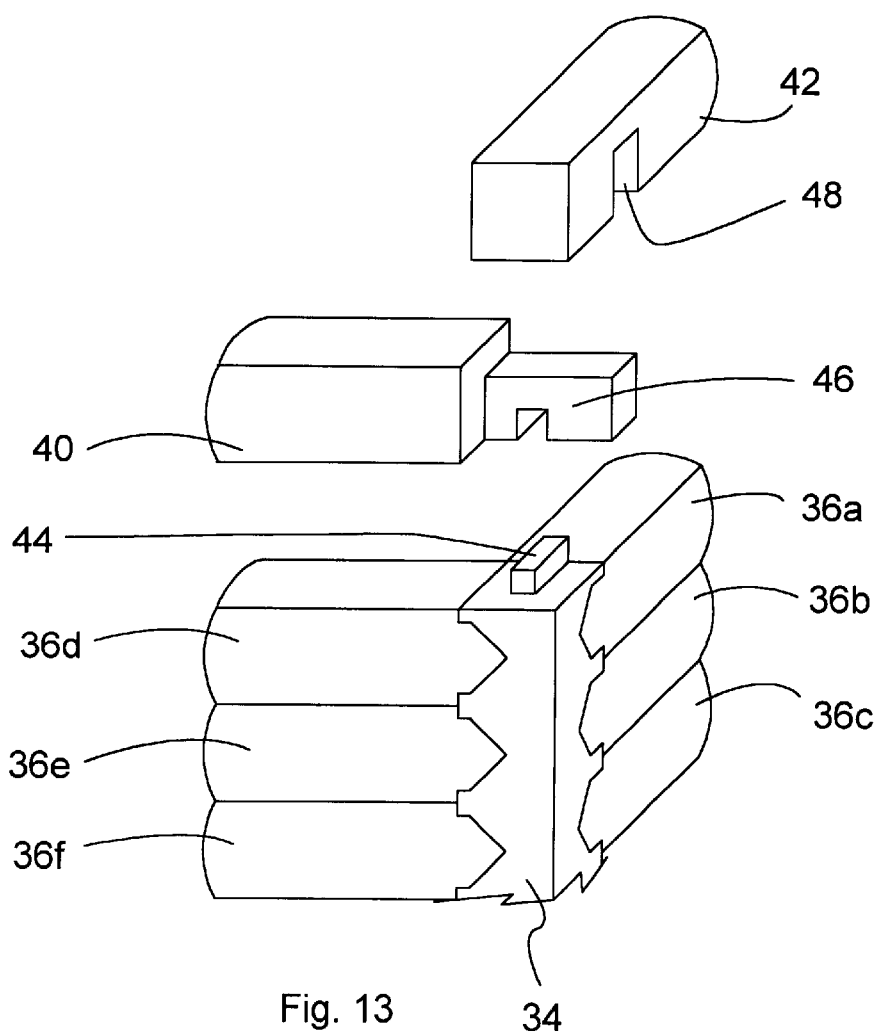
FIG. 13 is a perspective view of a corner of a log home made with joints of the present invention.
Figure 14:
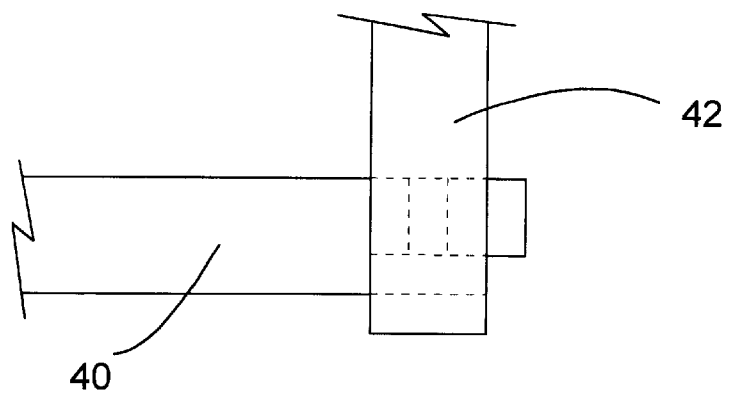
FIG. 14 is a top view of the log home embodiment of FIG. 13.

FIG. 13 is a perspective view of a log house using the no-slip corner joint of the present invention. It should be noted that this construction method is not limited to logs or wood, but can be used with other construction materials as well. The first structural member 34 has a number of mortises formed into it, as described above, except that they are also formed one on top of the other. Tenons are formed into the ends of the second structural member logs 36a–36f such that they form a tight joint with the first structural member 34. If desired, the top logs can be locked together. The first structural member 34 can be formed with a boss 44 on top. One of the top logs 40 can be provided with a notched projection 46 suitably adapted to receive the boss 44. The boss 44 is preferably about one-third the thickness of a log beam, and is flush to one side of the first structural member 34. A second top log 42 can be provided with a slot 48 suitably adapted to receive the notched projection 46 of the first top log 40, and overhang by about one-third of the beam width. The notched projection 46 is also not centered, but is preferably adapted to receive the boss 44 flush to one side of the structural member 34. The second top log 42 is preferably adapted to receive the notched projection 46 and boss 44, and overhang by about one-third of a beam width. This system can be repeated at the top of every corner of the house. FIG. 14 shows a top view of the top logs 40 and 42 assembled.

The advantage of this type of joint for a log house is that wood is not wasted to form the out-hanging portion of the joint of the prior art. The advantage of the top log arrangement as described is that increases the shear surface to ⅔ by ⅔ of the beam width. The result of this arrangement is that it holds the assembly together with great stength. As a result of using the joint of the present invention, the floor space inside can be larger by 16 to 18 inches (41 cm to 46 cm) per side for a given length of log. Construction is easier and more accurate, and also aids door and window placement.

One of the many benefits of the joint is its ease of manufacture by any builder with the most basic of tools. For example the book case 30 of FIG. 11 can be made with a 12 inch (30 cm) table saw, shaper or drill press with a 1 inch (2.5 cm) countersink, sander, belt, and disk, clamps to hold the frame after gluing, a 12 inch (30 cm) planer, and jointer.

Making the V-groove portion 12 is done by first installing the 1 inch (2.5 cm) diameter 90 degree countersink in a shaper, then pushing the first structural member 10 past the countersink while holding the member 10 to a guide in the table of the shaper. The V-shaped projection portions 22 can also be made with by pushing the second structural member 18 past the countersink while holding it against a guide in the table of the shaper.

The opposing face portions 20 of the V-shaped projection portion 22 can be machined using a table saw. It is within the ability of a person having ordinary skill in the art to use these machines, and to control the given width of the V-shaped projection portion 22.

In mass production it would likely be easier to machine the groove and projection portions using specially made shaper cutters. There would be a male cutter for forming the mortise, and a female cutter for forming the tenon. In practice, there are also other means for manufacturing the elements of the joint, including but not limited to using an end mill, router, or even a chisel.

In conclusion, the joint of the present invention provides a number of significant benefits. It provides a corner joint whose structural members are cut in at least two directions, instead of one direction for the chamfered cut and abutting type of joints. The joint has two half-steps to carry the shear forces. Since glue is weaker in shear than in tension, the joint of the present invention is stronger than the types that must carry shear in the glue. It does not require any additional parts to carry the shear force, like dowels, nails, or brackets.

The joint lends itself readily to three member application. It can accommodate assembly with panels. The joint is easy to produce and assemble. It allows one to build a strong frame that makes very efficient use of material, which means that the items built with the joint can be less expensive. Finally, the joint has a wide application, and can be used in door frames, cabinets, chairs, and other furniture where strong two member and three member joints are used.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

I claim:

1. A joint for securing two structural members together at right angles, said joint comprising a mortise and a tenon, wherein
   said mortise in a first structural member is defined by a V-shaped groove portion of a given width terminating in two opposing face portions perpendicular to a mating surface of the first structural member, and
   said tenon in a second structural member is defined by a V-shaped projection portion of a given width terminating in two opposing face portions parallel to a mating edge of the second structural member, such that when the mortise and tenon are assembled the first and second structural members interlock at said mating surface and said mating edge.

2. The joint of claim 1, wherein said two structural members are secured horizontally when the joint is in use.

3. The joint of claim 1, wherein said V-shaped groove and V-shaped projection have included angles that are substantially the same.

4. The joint of claim 3, wherein said included angles are 90 degree angles.

5. The joint of claim 1, wherein said given widths of said V-shaped groove and V-shaped projection are substantially the same.

6. The joint of claim 1, wherein said first and second structural members are made of wood, and glue is disposed between the mortise and tenon before assembly to form a no-slip corner joint.

7. The joint of claim 1, wherein said mortise is formed by machining said first structural member with a nominal 90 degree countersink tool.

8. The joint of claim 1, wherein said V-shaped projection portion is form by machining each leg of the V-shaped projection with a nominal 90 degree countersink tool.

9. The joint of claim 1, wherein said two opposing face portions of said tenon are formed by machining them with a table saw.

10. The joint of claim 1, wherein said V-shaped groove portion and two opposing face portions are formed by machining using a male shaper cutting of the same shape.

11. The joint of claim 1, wherein said V-shaped projection portion and two opposing face portions are formed by machining using a female shaper cutter of the same shape.

12. A joint for securing three structural members together at right angles, said joint comprising a mortise and two tenons, wherein
   said mortise in a first structural member is defined by two V-shaped groove portions at right angles to each other of a given width terminating in two opposing face portions perpendicular to two mating surfaces of the first structural member,
   said tenons in a second and third structural member are defined by a V-shaped projection portion of a given width terminating in two opposing face portions parallel to a mating edge of the second and third structural members, and
   said V-shaped projection portion of the tenons is further defined by a 45 degree face perpendicular to the mating edge of the second structural member reaching from one opposing face portion to a point in the middle of the tenon, such that when the mortise and two tenons are assembled the three structural members interlock at said mating surface and said mating edges.

13. The joint of claim 12, wherein said three structural members are secured horizontally when the joint is in use.

14. The joint of claim 12, wherein said V-shaped groove and V-shaped projection have included angles that are substantially the same.

15. The joint of claim 14, wherein said included angles are 90 degree angles.

16. The joint of claim 12, wherein said given widths of said V-shaped groove and V-shaped projection are substantially the same.

17. The joint of claim 12, wherein said first and second structural members are made of wood, and glue is disposed between the mortise and tenon before assembly to form a no-slip corner joint.

18. The joint of claim 12, wherein said mortise is formed by machining said first structural member with a nominal 90 degree countersink tool.

19. The joint of claim 12, wherein said V-shaped projection portion is form by machining each leg of the V-shaped projection with a nominal 90 degree countersink tool.

20. The joint of claim 12, wherein said two opposing face sections of said tenon are formed by machining them with a table saw.

21. A joint for securing three structural members together at non-right angles, said joint comprising a mortise and two tenons, wherein
   said mortise in a first structural member is defined by two V-shaped groove portions at non-right angles to each other of a given width terminating in two opposing face portions perpendicular to two mating surfaces of the first structural member,
   said tenons in a second and third structural member are defined by a V-shaped projection portion of a given width terminating in two opposing face portions parallel to a mating edge of the second and third structural members, and said V-shaped projection portion of the tenons is further defined by an angled face perpendicular to the mating edge of the second structural member reaching from one opposing face portion to a point on a distal edge of the V-shaped projection portion, such that when the mortise and two tenons are assembled the three structural members interlock at said mating surface and said mating edges.

* * * * *